United States Patent
Chen et al.

(10) Patent No.: US 8,310,355 B2
(45) Date of Patent: Nov. 13, 2012

(54) VEHICULAR COLLISION WARNING SYSTEM

(75) Inventors: Chia-Tseng Chen, Lugang (TW);
Yu-Sheng Liao, Lugang (TW);
Hsiang-Chun Kao, Lugang (TW)

(73) Assignee: Automotive Research & Test Center, Changhua County (TW)

( * ) Notice: Subject to any disclaimer, the term of this patent is extended or adjusted under 35 U.S.C. 154(b) by 449 days.

(21) Appl. No.: 12/588,185

(22) Filed: Oct. 7, 2009

(65) Prior Publication Data

US 2010/0321174 A1 Dec. 23, 2010

(30) Foreign Application Priority Data

Jun. 19, 2009 (TW) .............................. 98120717 A

(51) Int. Cl.
*B60Q 1/00* (2006.01)

(52) U.S. Cl. .................... 340/435; 340/903; 701/301

(58) Field of Classification Search .................. 340/435, 340/436, 901–904; 700/300, 301; 382/103, 382/104, 106, 107; 701/300, 301
See application file for complete search history.

(56) References Cited

U.S. PATENT DOCUMENTS

| | | | | |
|---|---|---|---|---|
| 5,517,196 A | * | 5/1996 | Pakett et al. | 342/70 |
| 7,061,373 B2 | * | 6/2006 | Takahashi | 340/435 |
| 2004/0090317 A1 | * | 5/2004 | Rothkop | 340/435 |
| 2006/0070787 A1 | * | 4/2006 | Bartels | 180/271 |
| 2006/0184297 A1 | * | 8/2006 | Higgins-Luthman | 701/300 |
| 2007/0127778 A1 | * | 6/2007 | Fujimoto | 382/104 |
| 2008/0309516 A1 | * | 12/2008 | Friedrichs et al. | 340/935 |

* cited by examiner

*Primary Examiner* — Thomas Mullen
(74) *Attorney, Agent, or Firm* — Rosenberg, Klein & Lee

(57) ABSTRACT

A vehicular collision warning system comprises at least one image capture device capturing images of blind spots, a processing unit receiving the images of blind spots from the image capture device, and at least one alert device. The processing unit identifies at least one barrier from the images and calculates the speed and transverse displacement of the barrier according to the positional change with respect to time. The processing unit presets at least one attention area on the image, estimates whether the barrier will appear in the attention area, sends out an alert-triggering signal to trigger the alert devices to generate sound, light, or pictures to warn the driver early. Cooperating with the speed sensor, brake system and turn light system, the vehicular collision warning system can trigger different alert signals according to the grading of danger to actively warn the driver early.

18 Claims, 9 Drawing Sheets

VEHICULAR COLLISION WARNING SYSTEM

BACKGROUND OF THE INVENTION

1. Field of the Invention

The present invention relates to a barrier detection system, particularly to a vehicular collision warning system, which is installed on a large-size vehicle, and used to detect the barriers in the driver's blind spots, and warn the driver early.

2. Description of the Related Art

As a large-size vehicle has greater height and length, the driver has limited vision area, and a considerable number of blind spots exist around the large-size vehicle. For example, there are some blind spots in the front side, left side, and right side of a large-size vehicle. Many accidents of large-size vehicles are attributed to the blind spots. The front of a large-size vehicle usually has a ground view mirror because the direct impact causes the most serious harm to pedestrians or vehicles.

The EU ECE R46 (European Union Economic Commission for Europe Regulation No. 46) concerns the blind spots for a driver of a large-size vehicle and provides regulations for front view mirrors and rear view mirrors. However, the rear view mirror is a curved-surface mirror. Thus, the driver cannot determine the distances between the vehicle and the surrounding objects instinctively but judges them with experience. Even multiple view mirrors cannot eliminate all the blind spots. To make matters worse, it is hard for the driver to watch all the view mirrors simultaneously. Further, the view mirrors cannot warn the driver actively. Thus, the driver himself still has to be very careful about the blind spots surrounding the vehicle lest an accident occur. Therefore, only installing view mirrors is insufficient to prevent traffic accidents.

Some references propose solutions for the abovementioned problems. For an example, a Taiwan patent No. M303843 uses a wide-angle camera to capture the images of around the blind spots and uses a display device to present the images in the driver's cabin. However, the driver cannot always watch the images anytime. If the driver distracts his attention to the images, an accident may occur contrarily. For another example, an EP patent No. EP1988488 disclosed a detection system to detect moving objects inside blind spots, wherein a camera is also used to capture the images around the vehicle, and the picture is divided into several blocks. The mobility of the blocks is analyzed to determine whether there are barriers around the vehicle. When the picture is divided into greater blocks, the recognizability is poor, which is likely to cause a wrong detection. When the picture is divided into smaller blocks, the recognizability is promoted. However, smaller blocks (more blocks in a picture) may overburden the processor and cause that the detection system cannot warn the driver timely.

Accordingly, the present invention proposes a vehicular collision warning system, which performs high-efficiency image processing to detect the blind spots, especially the blind spots before and beside the vehicle, and which warns the driver in different intensities according to the grading of danger, whereby are overcome the conventional problems.

SUMMARY OF THE INVENTION

The primary objective of the present invention is to provide a vehicular collision warning system, which uses an image processing technology to detect driver's blind spots of a large-size vehicle circumspectly and warns the driver early when there is danger approaching, whereby are effectively reduced traffic accidents.

Another objective of the present invention is to provide a vehicular collision warning system, which grades the danger of the barriers inside the blind spots around a large-size vehicle and actively sends out an alert of images, light or sound to warn the driver according to the grading of danger.

Yet another objective of the present invention is to provide a vehicular collision warning system, which uses image complexity calculation to detect the existence, speed and transverse displacement of a barrier to lower the probability of wrong judgment or over sensitivity of the system.

A further objective of the present invention is to provide a vehicular collision warning system, which performs high-efficiency image processing to detect whether the front attention area has a barrier moving at a speed within a specified range and possessing a transverse displacement, and which warns the driver when such a barrier exists.

To achieve the abovementioned objective, the present invention proposes a vehicular collision warning system, which comprises image capture devices, a processing unit and alert devices all installed in a large-size vehicle. The image capture devices detect the blind spots of the driver of the vehicle and capture at least one image of the blind spots. The processing unit performs image processing on the images to identify the barriers in the blind spots and uses the positional changes with respect to time to estimate the moving speeds and the transverse displacements of the barriers. The processing unit respectively presets attention areas in the images of the blind spots. If the processing unit detects a barrier having a transverse displacement in the attention area, it sends out an alert-triggering signal. The alert devices are electrically connected to the processing unit to receive the alert-triggering signal and then respectively send out alerts of images, light and sound to remind the driver to notice the possible danger.

The processing unit may further cooperate with the speed sensor, brake system and turn light system of the large-size vehicle to send out different warning signals according to the grading of danger.

Below, the embodiments are described in detail in cooperation with the attached drawings to make easily understood the objectives, technical contents, characteristics and accomplishments of the present invention.

DETAILED DESCRIPTION OF THE INVENTION

The present invention uses an image processing technology to identify whether a possible danger exists in the blind spots of the driver of a large-size vehicle and sends out different alert-triggering signals to trigger alert devices of images, light or sound according to the grading of danger. Below is defined the area of a blind spot of a large-size vehicle equipped with the system of the present invention before the description of the embodiments.

In the embodiments of the present invention, the blind spots used are based on the blind spots of a N3-type large-size vehicle defined by ECE R46 (Economic Commission for Europe, Regulation No. 46). ECE R46 provides that the front blind spot of the N3-type large-size vehicle is within 2 meters from the front of the vehicle. The area more than 2 meters from the front of the vehicle is the directly-visible area of the driver. The side blind spot is within 2 meters from the lateral side of the vehicle, 1 meter in front of the driver, and 1.75 meters behind the driver. The area outside the side blind spot is also the directly-visible area of the driver. Based on the definition of the blind spots, the structure and process of the present invention are described in detail below.

Figure 1:
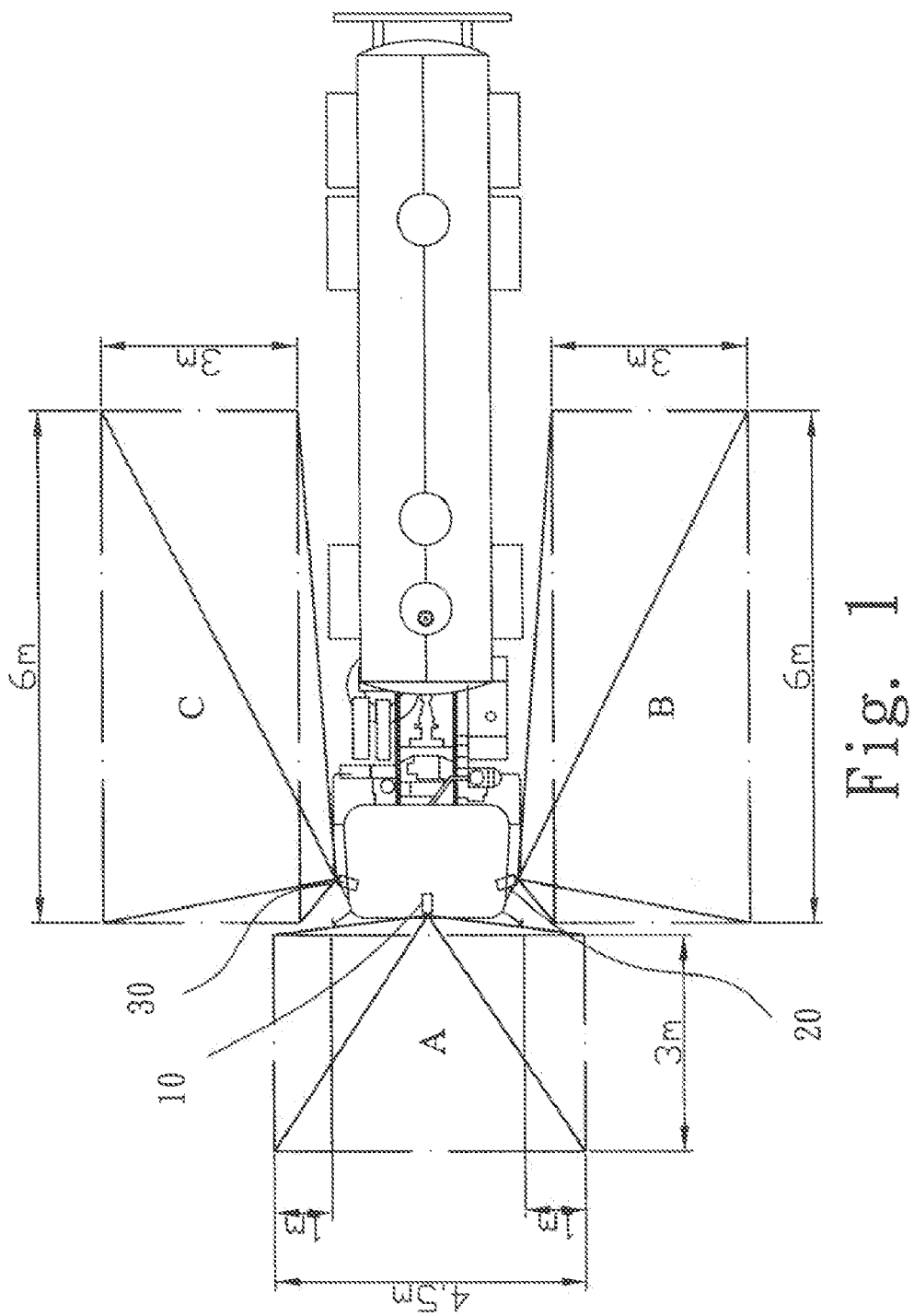
FIG. 1 is a top view of a large-size vehicle equipped with a vehicular collision warning system according to the present invention.
Figure 2:
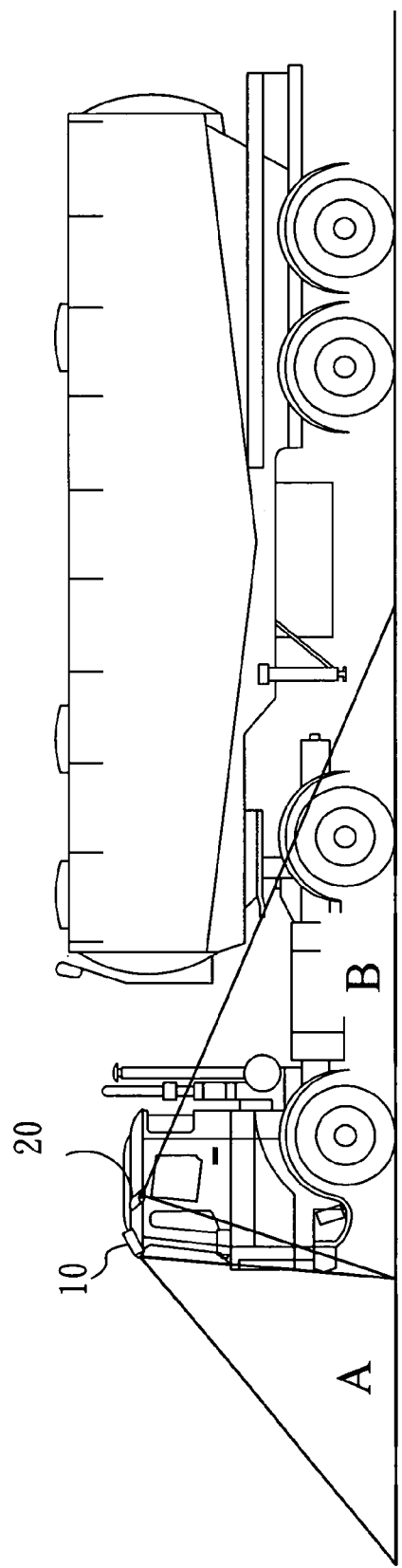
FIG. 2 is a side view of a large-size vehicle equipped with a vehicular collision warning system according to the present invention.
Figure 3:
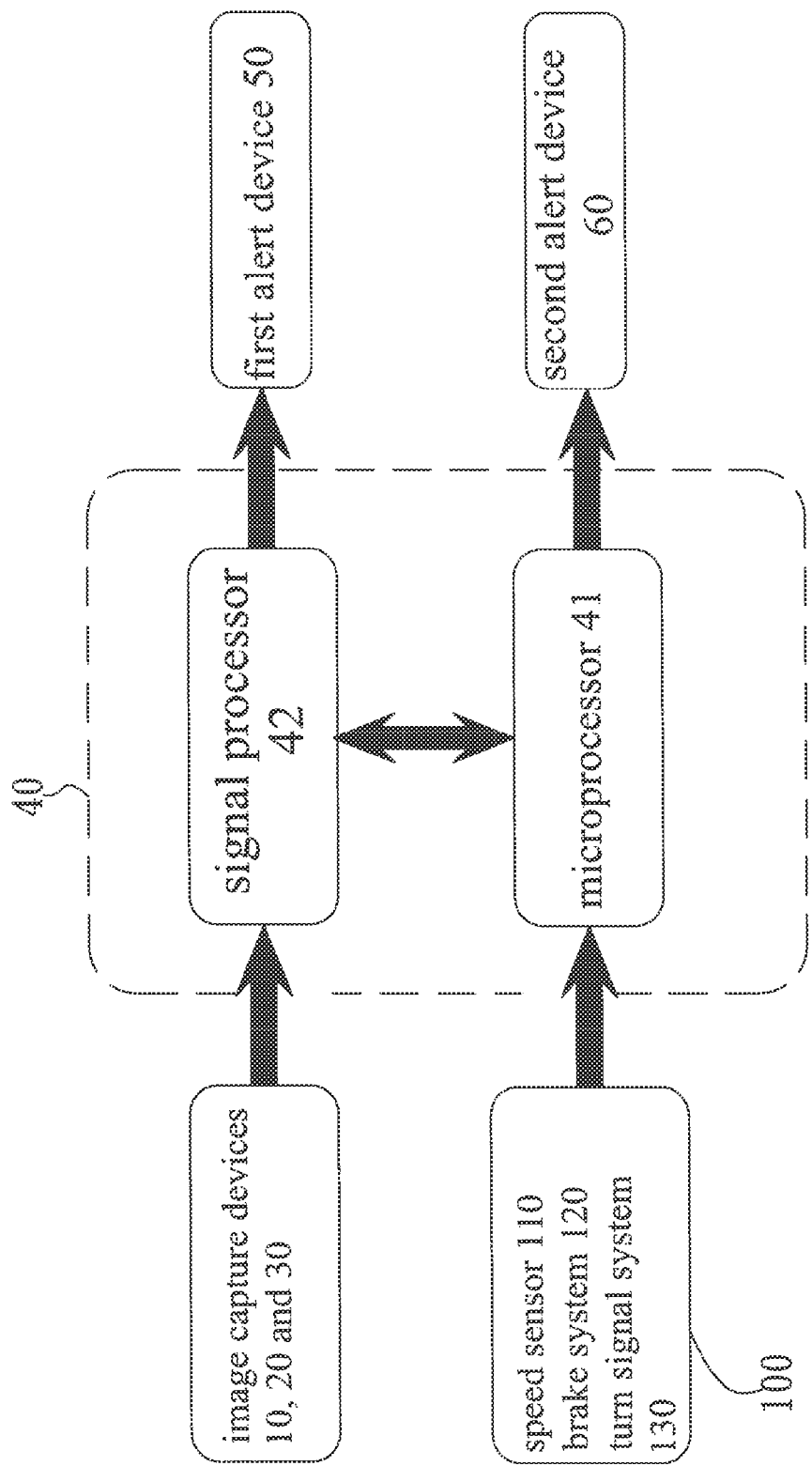
FIG. 3 is a block diagram schematically showing the architecture of a vehicular collision warning system according to a first embodiment of the present invention.

Refer to FIG. 1 and FIG. 2 respectively a top view and a side view of a large-size vehicle 100 equipped with the system of the present invention. Also refer to FIG. 3 a block diagram schematically showing the architecture of a vehicular collision warning system according to a first embodiment of the present invention. The system of the present invention comprises a first image capture device 10, a second image capture device 20, a third image capture device 30, a processing unit 40, a first alert device 50, and a second alert device 60. The system of the present invention is electrically connected to a speed sensor 110, a brake system 120 and a turn signal system 130 of the large-size vehicle 100.

The image capture devices 10, 20 and 30 are usually CCD (Charge Coupled Device) camera devices or CMOS (Complementary Metal Oxide Semiconductor) camera devices. The image capture devices 10, 20 and 30 are electrically connected to the processing unit 40 and respectively installed in the front side, the left side and the right side of the driver's cabin of the large-size vehicle 100 to capture the images of a first blind spot, a second blind spot and a third blind spot. The present invention does not limit the number of the image capture devices but may flexibly adjust the number of the image capture devices to meet the practical requirement.

The processing unit 40 includes a microprocessor 41 and a signal processor 42. The microprocessor 41 is electrically connected to the speed sensor 110, the brake system 120 and the turn light system 130. The microprocessor 41 receives speed information from the speed sensor 110 and generates a speed signal. The microprocessor 41 is triggered by the starting of the brake system 120 to generate a braking signal and triggered by the starting of the turn light system 130 to generate a turning signal. In this embodiment, the signal processor 42 is a multi-channel DSP (Digital Signal Processor), which can parallel process multiple signals, establish a simulation environment, perform logic analysis and output digital graphs. The signal processor 42 is electrically connected to the microprocessor 41 and the first, second and third image capture devices 10, 20 and 30. The signal processor 42 defines a first attention area A corresponding to the image of the first blind spot, a second attention area B corresponding to the image of the second blind spot and a third attention area C corresponding to the image of the third blind spot. The first attention area A is defined to be an area within 3 meters from the front side of the vehicle, 1 meter from the left side of the vehicle, and 1 meter from the right side of the vehicle. The second attention area B is defined to be an area within 3 meters from the left side of the vehicle, 1 meter in front of the driver and 5 meters behind the driver. The third attention area C is defined to be an area within 3 meters from the right side of the vehicle, 1 meter in front of the driver and 5 meters behind the driver. The attention areas are designed to be larger than the blind spots required by the regulations to provide an early-warning function. The abovementioned data is only for exemplification. The present invention does not limit the data. The data used should be modified according to the capability of the image capture devices and the type of vehicle.

The signal processor 42 receives the images of the blind spots and identifies whether the first attention area has a barrier with a transverse displacement, and whether the second/third attention area has a barrier with a longitudinal displacement. Next, the signal processor 42 verifies whether there is a braking signal or turning signal occurring after the appearance of the barrier. Then, the signal processor 42 sends out a first alert-triggering signal or a second alert-triggering signal according to the grading of danger. The microprocessor 41 and the signal processor 42 are bidirectional-communication platforms, which can exchange the speed signal, braking signal, and turning signal received by the microprocessor 41 and the alert-triggering signals sent out by the signal processor 42.

Figure 4:
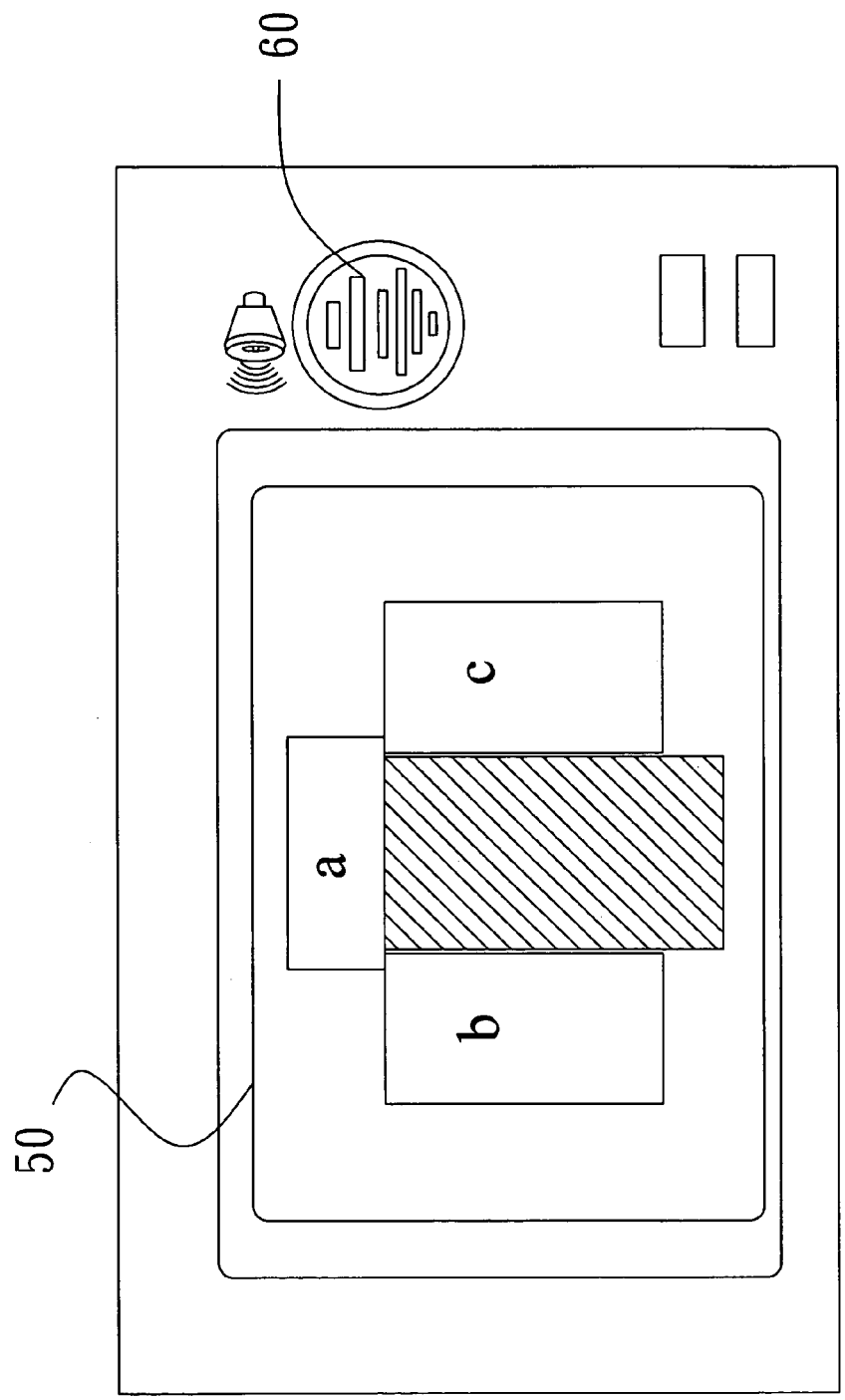
FIG. 4 is a diagram schematically showing a first alert device and a second alert device according to the present invention.

FIG. 4 is a diagram schematically showing a first alert device and a second alert device according to the present invention. The first alert device 50 has a first alert zone a, a second alert zone b and a third alert zone c respectively corresponding to the first, second and third attention areas A, B and C. The first alert device 50 uses the first, second and third alert zones a, b and c to indicate the region where a barrier appears. When the first alert device 50 is an LCD display, the LCD display is electrically connected to the signal processor 42 and presents digital images simulating the statuses of the attention areas A, B and C. When the first alert device 50 is a light-emitting element, such as a LED light, the LED light is electrically connected to the microprocessor 41. When the second alert device 60 is an audio device, such as a buzzer or a speaker, the buzzer or speaker is electrically connected to the microprocessor 41. The audio device can include a voice system. The first alert device 50 is triggered by the first alert-triggering signal to warn the driver with images or light. The second alert device 60 is triggered by the second alert-triggering signal to use sound to force the driver to notice danger approaching.

Above has been described the relationship of the components in the system of the present invention. Below is described the process to distinguish barriers from the background in the images of the blind spots. Then, the method of the present invention is described in detail.

Figure 5:
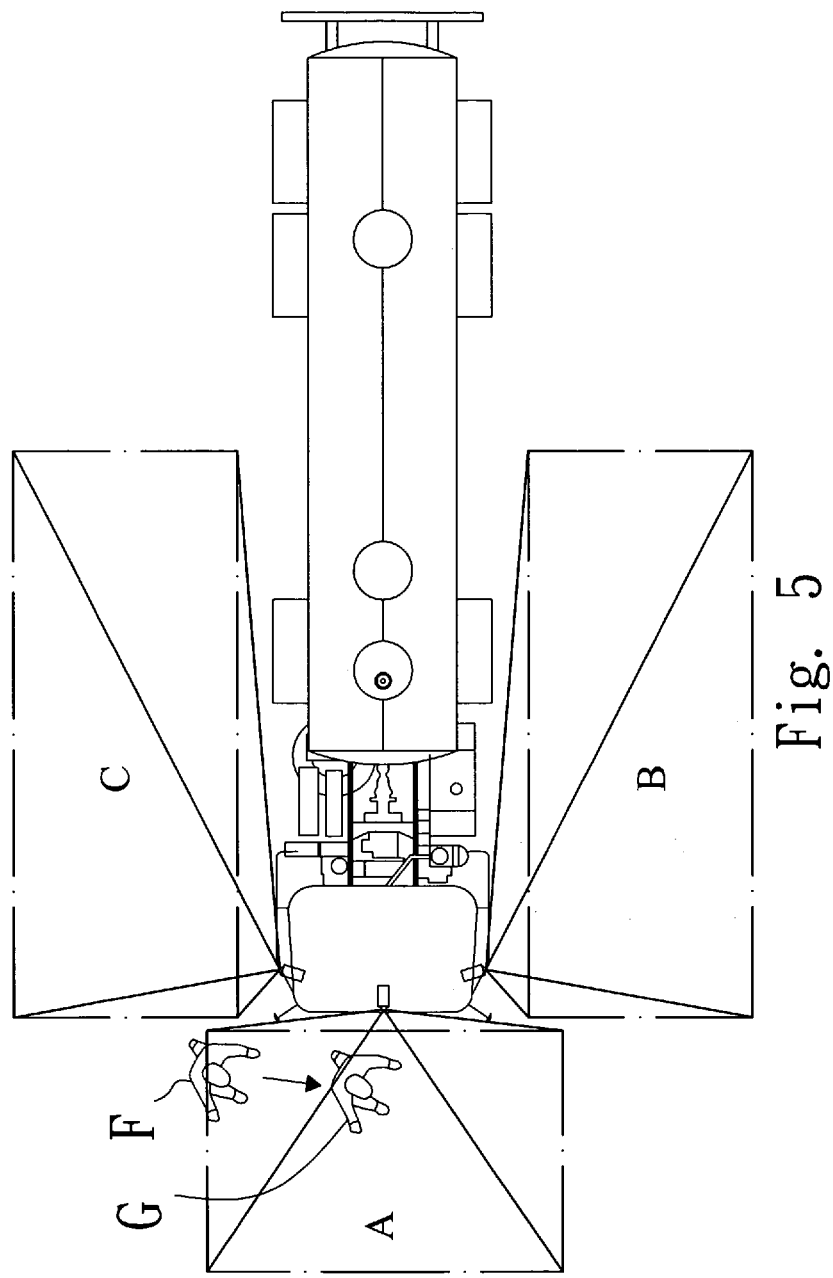
FIG. 5 is a diagram schematically showing an instance where a barrier enters the first attention area.
Figure 6:
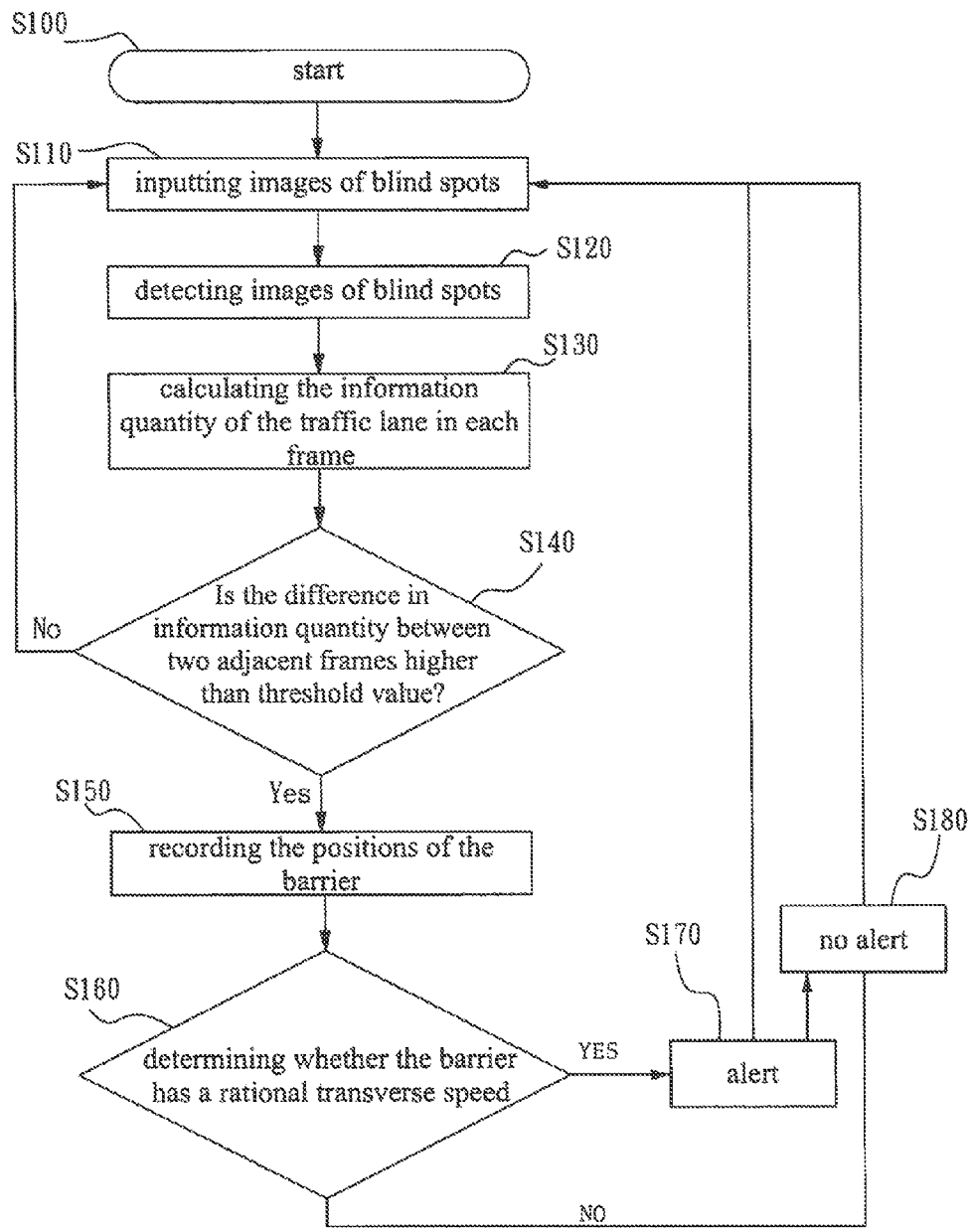
FIG. 6 is a flowchart of a process to identify a barrier in front of a vehicle according to the present invention.

FIG. 5 is a diagram schematically showing a case that a barrier enters the first attention area and moves from Point F to Point G. FIG. 6 is a flowchart of a process to identify a barrier in front of a vehicle according to the present invention. In Step S100, the collision warning system of the present invention is started. In Step S110, the images of the blind spots are input to the system. In Step S120, the system detects the images of the blind spots. In Step S130, the signal processor 42 calculates the entropy of local areas of the image of the first blind spot to learn the information quantity of the traffic lane in each frame and then records the results of calculation. The information quantity of a traffic lane is calculated according to Equation (1) and Equation (2):

$$I(x) = -\sum_{i=1}^{n} \log(p_i) \times p_i \quad (1)$$

$$p_i = \frac{G_i}{T_{pixels}} \quad (2)$$

wherein I is the information quantity of a traffic lane in the image of a blind spot, $G_i$ the number of the pixels having a gray level i in the image of the blind spot, $P_i$ the probability that the pixel having a gray level i appears in the image of the blind spot, and $T_{pixels}$ the sum of the effective pixels in the image of the blind spot.

Figure 7:
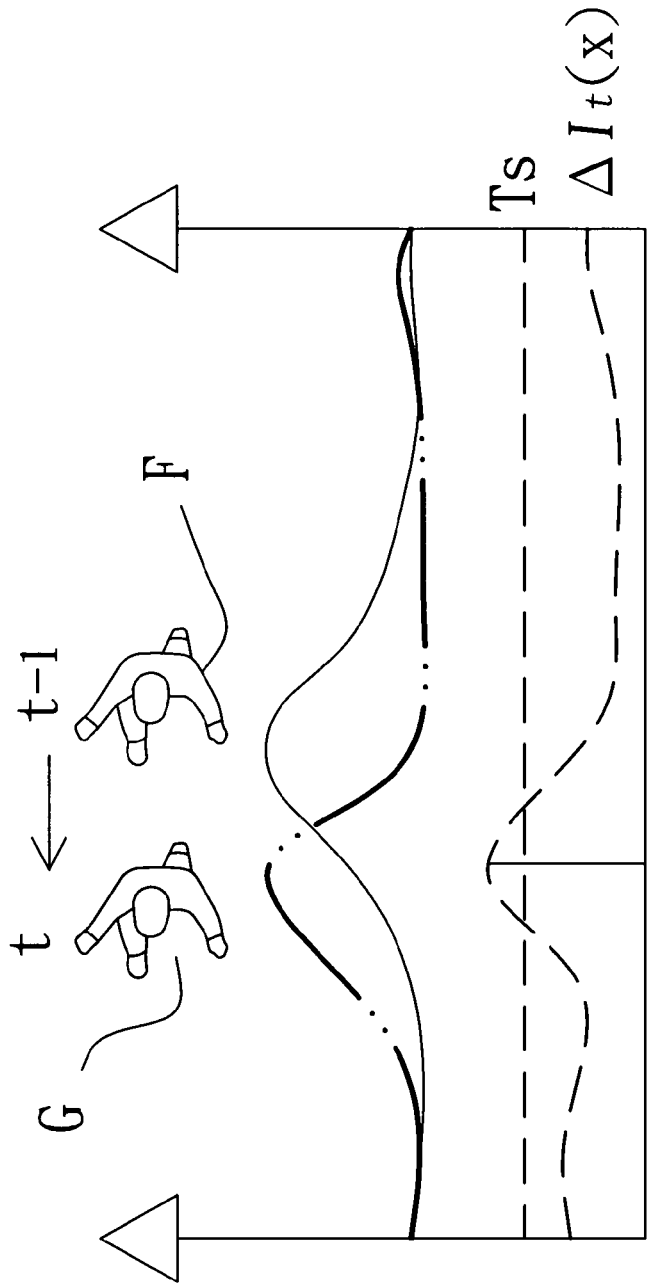
FIG. 7 is a diagram showing the distribution of the information quantity of the image of a traffic lane according to the present invention.

FIG. 7 is a diagram showing the distribution of the information quantity of the image of the traffic lane. In experiments, it is found: When there are only gray traffic lanes and white traffic lane lines appearing in the image of a blind spot, the information quantity is lower; when there are pedestrians, bikes or motor vehicles appearing and moving transversely in the image, the information quantity will reach a peak, as shown in FIG. 7. Thus, whether there is a barrier present can be determined after Step S130. A preset threshold $T_s$ is input to the signal processor 42 beforehand. The signal processor 42 will use the threshold $T_s$ to distinguish a barrier from the background. In Step S140, the difference of the information quantities of two adjacent frames is calculated and compared with the threshold $T_s$ to determine whether there is a barrier existing in the image. The preset threshold $T_s$, is calculated according to Equation (3):

$$T_s = \frac{(I_{max} - I_{min})}{2} \quad (3)$$

wherein $T_s$ is the preset threshold, $I_{max}$ the maximum information quantity when a barrier exists in the image, and $I_{min}$ the information quantity when there are only traffic lanes in the image. When the difference of the information quantities is determined to be greater than the threshold $T_s$, it is decided that there is a barrier present in the image. If the answer in Step S140 is "yes", the process proceeds to Step S150 to record the positions of the barrier. If the answer in Step S140 is "no", the process returns to Step S110 to input the images of the blind spot to the system. In Step S140, the difference of the information quantities of the images of the traffic lane of two adjacent frames is calculated according to Equation (4):

$$\Delta I_t(x) = I_t(x) - I_{t-1}(x) \quad (4)$$

wherein $\Delta I_t(x)$ is the difference of the information quantities of the images of the traffic lane, and $I_t(x)$ and $I_{t-1}(x)$ respectively the information quantities of the images of a traffic lane at a time point of t and a time point of t−1.

In Step S150, the signal processor 42 records the positions of the barrier at the time points of the frames and uses the positions to estimate the moving track of the barrier. In Step S160, the signal processor 42 calculates the transverse displacement and transverse speed of the barrier according to Equation (5):

$$\text{displacement of a barrier (pixels)} = \quad (5)$$

$$\frac{\text{distance (pixels)} \times \text{speed (m/s)}}{\text{physical distance (m)}} \times \text{time interval of frames (s)}$$

The abovementioned steps are to identify whether there is a moving object appearing in the images, and whether the moving object is a barrier. However, the image identification is apt to be affected by the environmental factors, especially in an open space. The result of oversensitive detection would perplex the driver. Thus, present invention supposes that the barrier, such as an automobile, a motorcycle, a bike or a pedestrian, moves at a speed with the transverse component of less than 22.5 km/h, and presets 22.5 km/h as the upper limit of the transverse speed of a barrier in the signal processor 42. If the transverse speed calculated by the signal processor 42 according to Equation (5) in Step S160 is over the upper limit, the moving object will be determined to be not a real barrier, it is considered as an irrational transverse displacement, and the process will proceed to Step S180 where no alert is sent out. If the transverse speed calculated by the signal processor 42 according to Equation (5) in Step S160 is below the upper limit, i.e. within 0-22.5 km/h, the moving object will be determined to be a barrier, it is considered as a rational transverse displacement, and the process will proceed to Step S170 where the system warns the driver early. No matter whether the process proceeds to Step S170 or Step S180, the process should then return to Step S110 and repeat all the steps.

The method for identifying a barrier should be apparent from the description of from Step S100 to Step S180. The most frequent accidents for a large-scale vehicle include that the driver does not perceive an object passing the area in front of the vehicle when he starts moving the vehicle at a low speed, and that the driver does not perceive an object moving at the left or right side of the vehicle when he is turning the vehicle left or right. Therefore, the detection method used by the signal processor 42 adopts two different modes to respectively detect the front blind spot and the left/right blind spot.

Figure 8:
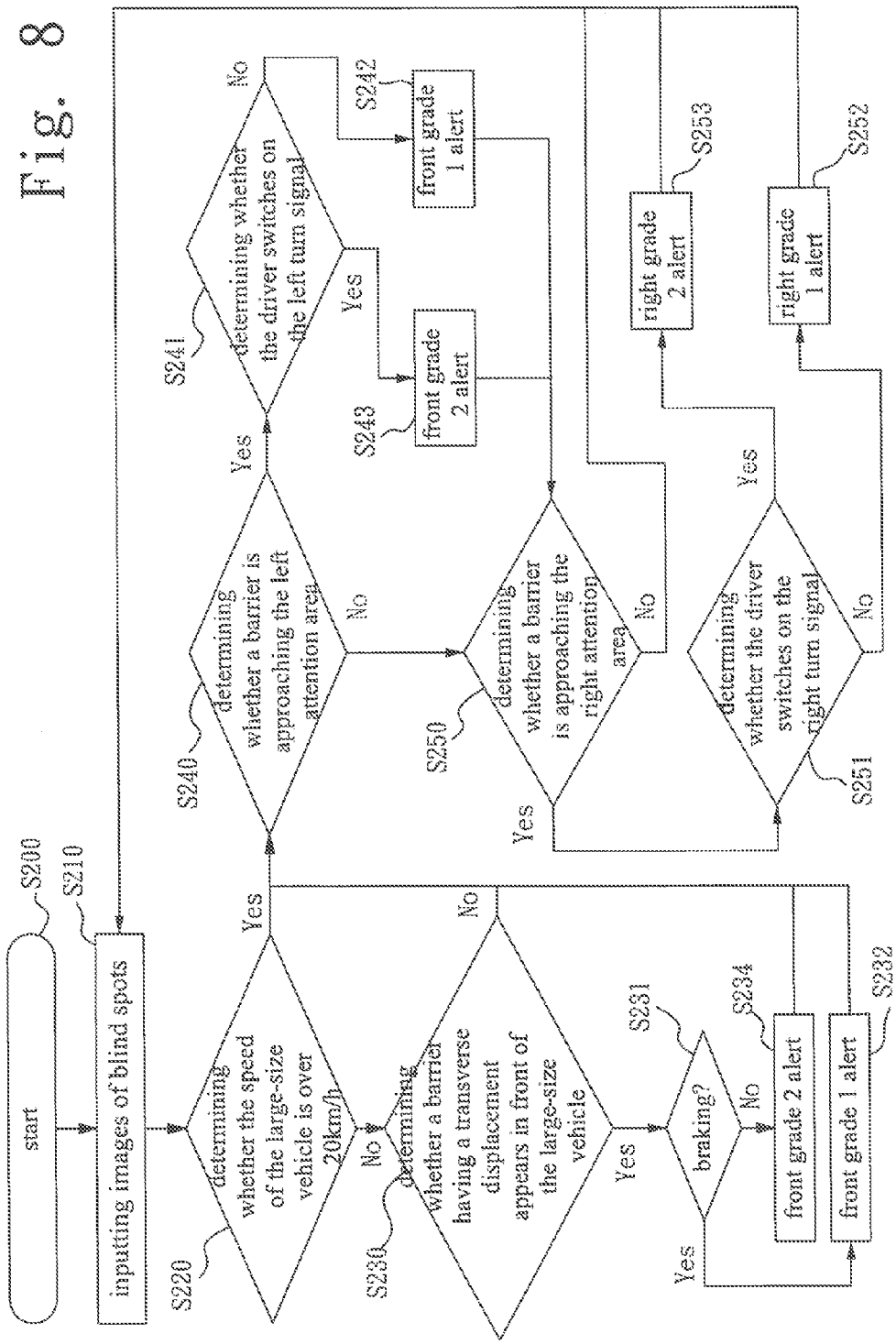
FIG. 8 is a flowchart of a graded early warning process according to the present invention.

FIG. 8 is a flowchart of a graded early warning process according to the present invention. Firstly, in Step S200, the collision warning system is started and the image capture devices 10, 20 and 30 are turned on. In Step S210, the signal processor 42 simultaneously receives the images of the front, left and right blind spots from the image capture devices 10, 20 and 30. The signal processor 42 has a built-in speed limit for the large-scale vehicle, such as 20 km/h. In Step S220, the signal processor 42 determines the running status of the vehicle according to the speed limit. If the speed is below the limit, the process proceeds to Step S230. If the speed is over the limit, the process proceeds to Step S240. In Step S230, the process is directed to the abovementioned barrier detection process of from Step 100 to Step S180 to identify whether there is a barrier existing in the front (first) attention area A. If the signal processor 42 determines that a barrier is in front of the vehicle, the signal processor 42 further verifies whether the microprocessor 41 has sent out a braking signal in Step S231. If the answer is "yes", it means that although an object is passing the area in front of the large-scale vehicle 100, the driver is braking the large-scale vehicle 100, and the process proceeds to Step S232 where the first alert zone a of the first alert device 50 emits light (a first alert signal or a grade 1 alert) to remind the driver to notice the object in front of the vehicle. If the answer in the S231 is "no", it means that an object is passing the area in front of the large-scale vehicle 100, but the driver does not brake the vehicle although the vehicle is moving at a speed of less than 20 km/h. In such a case, the vehicle still has a possibility of collision. Thus, the process proceeds to Step S234 where the second alert-triggering signal enables the second alert device 60 to emit sound (a second alert signal or a grade 2 alert) to remind the driver to swerve or brake in addition to the light emitted by the first alert zone a of the first alert device 50. After the ending of Step S232 or Step S234, the process proceeds to Step S240.

The process to avoid the front collision has been demonstrated in from Step S230 to Step S234. It should be noted that the front attention area A is only within 3 meters in front of the large-size vehicle, and that when a barrier appears in the front attention area A, it is hard for the large-size vehicle moving at a speed of over 20 km/h to avoid a collision by braking because of the weight and size of the large-scale vehicle. If the driver should brake the large-size vehicle compulsorily, a more serious accident may take place.

Figure 9:
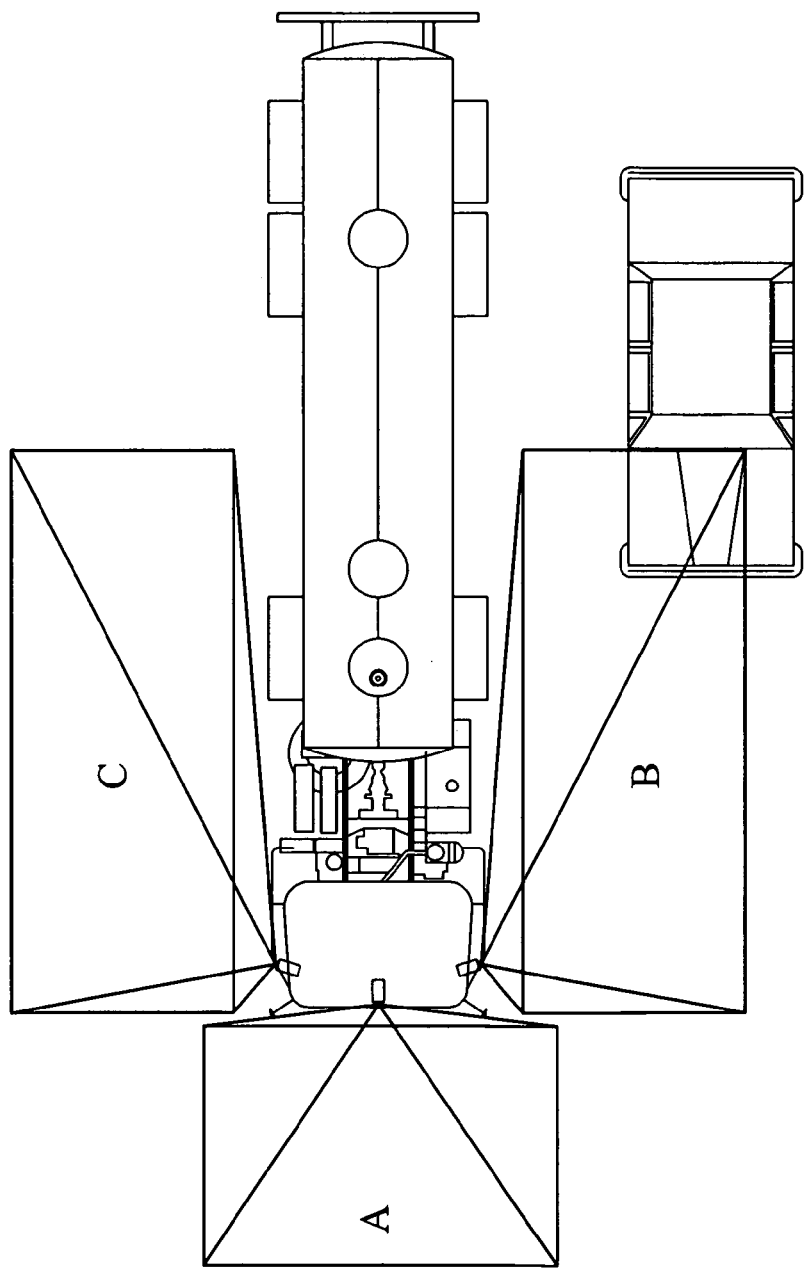
FIG. 9 is a diagram schematically showing a case that a barrier enters the left attention area.

Next is described the process to detect the left and right sides of the driver cabin of the vehicle. When the vehicle is determined to move at a speed of over 20 km/h in Step S220, the process proceeds to Step S240. In Step S240, the signal processor 42 determines whether there is a barrier moving longitudinally in the second (left) attention area B. If a car appears in the left attention area B (as shown in FIG. 9), the process proceeds to Step S241 to verify whether the microprocessor 41 has sent out a turning signal, i.e. to verify whether the driver intends to turn the large-size vehicle to the left. If the driver does not intend to turn the large-size vehicle to the left, the process proceeds to Step S242 where a left first alert signal (left grade 1 alert) is sent out, i.e. the second alert zone b of the first alert device 50 emits colored light, to remind the driver. If Step S241 confirms that the driver intends to turn the vehicle to the left, it means that the probability of collision greatly increases, and the process proceeds to Step S243 where a left second alert signal (left grade 2 alert) is sent out, i.e. the second alert zone b of the first alert device 50 emits colored light and the second alert device 60 emits sound, to remind the driver to notice the approaching danger. If Step S240 determines that no barrier appears on the left side of the vehicle, the process proceeds to Step S250 to identify whether a barrier appears in the third (right) attention area C. Next, in Step S251, the signal processor 42 determines whether the microprocessor 41 has sent out a turning signal. If no turning signal has been sent out, the process proceeds to Step S251 to emit a right first alert signal (right grade 1 alert). If a turning signal has been sent out, the process proceeds to Step S253 to emit a right second alert signal (right grade 2 alert). The detailed process of from Step S250 to Step S253 is similar to that of from Step S240 to Step S243. Therefore, it will not be repeated herein.

The collision warning system of the present invention can actively alert the driver to avoid an accident. Via the image detection technology and the image processing technology, the present invention can determine whether to regard a moving object in a blind spot as a barrier and track it. Considering the mass and braking distance of a large-size vehicle, the present invention performs different detection modes according to the speed signal sent out by the speed sensor of the vehicle. Based on the signals from the brake system and the turn light system, the present invention grades the danger caused by a barrier at a certain position and actively warns the driver in an emergent condition with both light and sound. In a noncritical condition, the present invention reminds the driver to notice the area where a possible barrier exists with pictures or light.

The embodiments described above are to demonstrate present invention to enable the persons skilled in the art to understand, make and use the present invention. However, it is not intended to limit the scope of the present invention. Any equivalent modification or variation according to the spirit of the present invention is to be also included within the scope of the present invention, which is based on the claims stated below.

What is claimed is:

1. A vehicular collision warning system, which is used to detect barriers in at least one blind spot of a driver of a large-size vehicle, comprising:
   at least one image capture device installed on said large-size vehicle and used to capture images of said at least one blind spot;
   a processing unit electrically connected to said at least one image capture device for identifying at least one barrier from one or more captured images, said barrier having an upper speed limit defined as a preset speed, calculating a speed and a displacement of each of said at least one barrier according to positional change of each of said at least one barrier with respect with time, defining at least one attention area in images of said at least one blind spot, and sending out at least one alert-triggering signal when determining that one of said at least one barrier has said calculated displacement and said calculated speed lower than said preset speed in one of said at least one attention area; and
   at least one alert device electrically connected to said processing unit for receiving said alert-triggering signal and generating an alert signal of sound, light or displayable alert pictures;
   wherein said processing unit calculates informational quantities of traffic lanes of each of said images of said at least one blind spot, calculates difference of informational quantities of said traffic lanes of every two adjacent said images, compares a curve of said difference with a preset threshold, determines a position where said difference exceeds said preset threshold to be a position of a barrier, and determines positions where said difference is below said preset threshold to be a background.

2. The vehicular collision warning system according to claim 1, wherein said processing unit further comprises a signal processor calculating informational quantities of traffic lanes of each of said imnes of said at least one blind spot according to the following equations:

$$I(x) = -\sum_{i=1}^{n} \log(p_i) \times p_i, \text{ and}$$

$$p_i = \frac{G_i}{T_{pixels}};$$

wherein I is an information quantity of a traffic lane in an image of a blind spot, $G_i$ is a number of pixels having a gray level i in said image of said blind spot, $P_i$ is a probability that a pixel having a gray level i appears in said image of said blind spot, and $T_{pixels}$ is a total number of pixels in said image of said blind spot.

3. The vehicular collision warning system according to claim 2, wherein said signal processor calculates said preset threshold according to an equation expressed by $$T_s = \frac{(I_{max} - I_{min})}{2};$$

wherein $T_s$ is said preset threshold, $I_{max}$ is a maximum information quantity when a harrier is present in an image, and $I_{min}$ is an information quantity when there are only traffic lanes in said image.

4. The vehicular collision warning system according to claim 2, wherein said signal processor calculates said displacement according to an equation expressed by $$\Delta I_t(x) = I_t(x) - I_{t-1}(x);$$

wherein $\Delta I_t(x)$ is a difference of information quantities of images of a traffic lane, and $I_t(x)$ and $I_{t-1}(x)$ are respectively information quantities of images of a traffic lane at a time point oft and a time point of t−1.

5. The vehicular collision warning system according to claim 4, wherein said signal processor uses a ratio of an image size in pixels to a physical distance and a change of a pixel distance with respect to time, said change of a pixel distance being defined as the displacement of said barrier with respect to the pixels in which said barrier appears in a first image from the pixels in which said barrier appears a second image, to calculate a physical displacement and a physical speed of said barrier according to the following equations:

physical displacement of barrier (m)=[physical distance (m)/image size (pixels)]×change of pixel distance (pixels); and physical speed of barrier (m/s)=physical displacement of barrier (m)/time interval of frames (s).

6. The vehicular collision warning system according to claim 1, wherein a front side, a left side and a right side of said large-size vehicle respectively have at least one said blind spot;
said at least one image capture device includes a first image capture device installed in a front portion of said large-size vehicle and used to capture images of a first blind spot at said front side of said large-size vehicle, a second image capture device installed in a left portion of said large-size vehicle and used to capture images of a second blind spot at said left side of said large-size vehicle, and a third image capture device installed in a right portion of said large-size vehicle and used to capture images of a third blind spot at said right side of said vehicle.

7. The vehicular collision warning system according to claim 6, wherein for said first blind spot at said front side of said large-size vehicle, said displacement is a transverse displacement; and for said second and third blind spots at said left side and said right side respectively of said large-size vehicle, said displacement is a longitudinal displacement.

8. The vehicular collision warning system according to claim 6, wherein said at least one attention area defined by said processing unit includes a first attention area defined in an image of said first blind spot, a second attention area defined in an image of said second blind spot, and a third attention area defined in an image of said third blind spot;
said at least one alert device includes a first alert zone corresponding to said first attention area, a second alert zone corresponding to said second attention area, and a third alert zone corresponding to said third attention area; and
said first alert zone, said second alert zone and said third alert zone use said light or displayable alert pictures to indicate which of said attention areas where said barrier exists.

9. The vehicular collision warning system according to claim 8, wherein said large-size vehicle has a speed sensor detecting a speed of said large-size vehicle, a brake system and a turn signal system;
said processing unit further comprises:
a microprocessor electrically connected to said speed sensor, said brake system and said turn signal system;
said microprocessor receives a speed signal from said speed sensor, a braking signal from said brake system and a turning signal from said turn signal system;
said microprocessor includes a speed limit for said large-sized vehicle, and said microprocessor processes and analyzes the first, second and third attention areas;
whereby if said speed of said large-sized vehicle is greater than said speed limit of said large-sized vehicle, said microprocessor abandons processing and analyzing said first attention area but continues processing and analyzing said second attention area and said third attention area, and sends out one of two alert-triggering signals to indicate an emergency situation in said second attention area or said third attention area responsive to said turning signal when a barrier is present in said second attention area or said third attention area;
whereby if said speed of said large-size vehicle is less than said speed limit, said microprocessor firstly processes and analyzes said first attention area and sends out one of two alert-triggering signals to indicate an emergency situation in said first attention area responsive to said braking signal when a barrier is present in said first attention area, and then processes and analyzes said second attention area and said third attention area, and sends out one of two alert-triggering signals to indicate an emergency situation in said second attention area or said third attention area responsive to said turning signal when a barrier is present in said second attention area or said third attention area.

10. The vehicular collision warning system according to claim 9, wherein said speed limit for said large-sized vehicle is 20 km/h.

11. The vehicular collision warning system according to claim 9, wherein said at least one alert device includes a first alert device and a second alert device; said microprocessor sends out a first alert-triggering signal to trigger said first alert device and sends out a second alert-triggering signal to trigger said second alert device.

12. The vehicular collision warning system according to claim 1, wherein said preset speed is a value selected from within a range of 0 km/h to 22.5 km/h.

13. The vehicular collision warning system according to claim 1, wherein said at least one alert device is a buzzer, a voice system, a LED (Light Emitting Diode) light, or a LCD (Liquid Crystal Display) screen.

14. The vehicular collision warning system according to claim 1, wherein said at least one image capture device is a CCD (Charge Coupled Device) element or a CMOS (complementary metal oxide semiconductor) camera.

15. A vehicular collision warning system, which is used to detect barriers in at least one blind spot of a driver of a large-size vehicle, comprising:
at least one image capture device installed on said large-size vehicle and used to capture images of said at least one blind spot;
a processing unit electrically connected to said at least one image captured device for identifying at least one barrier from one or more captured images, said barrier having an upper speed limit defined as a preset speed, calculating a speed and a displacement of each of said at least one barrier according to positional change of each of said at least one barrier with respect with time, defining at least one attention area in images of said at least one blind spot, and sending out at least one alert-triggering signal when determining that one of said at least one barrier has said calculated displacement and said calculated speed lower than said preset speed in one of said at least one attention area; and at least one alert device electrically connected to said processing unit for receiving said alert-triggering signal and generating an alert signal of sound, light or displayable alert pictures;

wherein a front side, a left side and a right side of said large-size vehicle respectively have at least one said blind spot;

said at least one image capture device includes a first image capture device installed in a front portion of said large-size vehicle and used to capture images of a first blind spot at said front side of said large-size vehicle, a second image capture device installed in a left portion of said large-size vehicle and used to capture images of a second blind spot at said left side of said large-size vehicle, and a third image capture device installed in a right portion of said large-size vehicle and used to capture images of a third blind spot at said right side of said vehicle;

for said first blind spot at said front side of said large-size vehicle, said displacement is a transverse displacement; and for said second and third blind spots at said left side and said right side respectively of said large-size vehicle, said displacement is a longitudinal displacement; and said at least one attention area defined by said processing unit includes a first attention area defined in an image of said first blind spot, a second attention area defined in an image of said second blind spot, and a third attention area defined in an image of said third blind spot;

said at least one alert device includes a first alert zone corresponding to said first attention area, a second alert zone corresponding to said second attention area, and a third alert zone corresponding to said third attention area; and said first alert zone, said second alert zone and said third alert zone use said light or displayable alert pictures to indicate which of said attention areas where said barrier exists.

16. The vehicular collision warning system according to claim 15, wherein said large-size vehicle has a speed sensor detecting a speed of said large-size vehicle, a brake system and a turn signal system;

said processing unit further comprises:
a microprocessor electrically connected to said speed sensor, said brake system and said turn signal system;
said microprocessor receives a speed signal from said speed sensor, a braking signal from said brake system and a turning signal from said turn signal system;
said microprocessor includes a speed limit for said speed of said large-sized vehicle, and said microprocessor processes and analyzes the first, second and third attention areas;

whereby if said speed of said large-size vehicle is greater than said speed limit of said large-sized vehicle, said microprocessor abandons processing and analyzing said first attention area but continues processing and analyzing said second attention area and said third attention area, and sends out one of two alert-triggering signals to indicate an emergency situation in said second attention area or said third attention area responsive to said turning signal when a barrier is present in said second attention area or said third attention area;

whereby if said speed of said large-size vehicle is less than said speed limit, said microprocessor firstly processes and analyzes said first attention area and sends out one of two alert-triggering signals to indicate an emergency situation in said first attention area responsive to said braking signal when a barrier is present in said first attention area, and then processes and analyzes said second attention area and said third attention area, and sends out one of two alert-triggering signals to indicate an emergency situation in said second attention area or said third attention area responsive to said turning signal when a barrier is present in said second attention area or said third attention area.

17. The vehicular collision warning system according to claim 16, wherein said speed limit for said large-sized vehicle is 20 km/h.

18. The vehicular collision warning system according to claim 16, wherein said at least one alert device includes a first alert device and a second alert device; said microprocessor sends out a first alert-triggering signal to trigger said first alert device and sends out a second alert-triggering signal to trigger said second alert device.

* * * * *